United States Patent
Lee (10) Patent No.: US 9,198,238 B2
(45) Date of Patent: Nov. 24, 2015

(54) DRIVING LIGHT EMITTING CIRCUIT

(71) Applicant: SAMSUNG ELECTRONICS CO., LTD, Suwon-Si (KR)

(72) Inventor: Young Jin Lee, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 348 days.

(21) Appl. No.: 13/849,173

(22) Filed: Mar. 22, 2013

(65) Prior Publication Data

US 2013/0249425 A1 Sep. 26, 2013

(30) Foreign Application Priority Data

Mar. 23, 2012 (KR) .................. 10-2012-0029984

(51) Int. Cl.
| | |
|---|---|
| H05B 37/00 | (2006.01) |
| H05B 39/00 | (2006.01) |
| H05B 41/14 | (2006.01) |
| H05B 33/08 | (2006.01) |

(52) U.S. Cl.
CPC .......... *H05B 33/0809* (2013.01); *H05B 33/083* (2013.01); *Y02B 20/342* (2013.01)

(58) Field of Classification Search
USPC .................... 315/201, 202, 205, 206
See application file for complete search history.

(56) References Cited

U.S. PATENT DOCUMENTS

| | | | | |
|---|---|---|---|---|
| 8,994,296 | B1* | 3/2015 | Chan | 315/362 |
| 2012/0043896 | A1* | 2/2012 | Lee et al. | 315/192 |
| 2013/0026935 | A1* | 1/2013 | Jong et al. | 315/201 |
| 2013/0249425 | A1* | 9/2013 | Lee | 315/201 |
| 2015/0163875 | A1* | 6/2015 | Yu et al. | 315/201 |
| 2015/0181659 | A1* | 6/2015 | Kang et al. | 315/186 |

FOREIGN PATENT DOCUMENTS

| | | |
|---|---|---|
| KR | 2011-0098890 A | 9/2011 |
| KR | 2011-0100577 A | 9/2011 |

* cited by examiner

*Primary Examiner* — Adam Houston
(74) *Attorney, Agent, or Firm* — McDermott Will & Emery LLP

(57) ABSTRACT

A light emitting circuit is provided. The light emitting circuit may include a first light emitting diode (LED) group to which LEDs are connected, and a second LED group to which LEDs are connected. A resistive load is serially connected to the first LED group to control a current with respect to the first LED group, and a capacitive load is serially connected to the second LED group to control a current with respect to the second LED group.

19 Claims, 9 Drawing Sheets

DRIVING LIGHT EMITTING CIRCUIT

CROSS-REFERENCE TO RELATED APPLICATION

This application claims priority to Korean Patent Application No. 10-2012-0029984, filed on Mar. 23, 2012, in the Korean Intellectual Property Office, the disclosure of which is incorporated herein by reference in its entirety.

TECHNICAL FIELD

The present application relates to a light emitting circuit, and more particularly, to a light emitting circuit capable of improving total harmonic distortion (THD) and flicker with the inclusion of a passive device.

BACKGROUND

Semiconductor light sources, such as light emitting diodes (LEDs), are expanding into the area of lighting. The importance of a power supply unit (PSU) is increasing in LED lighting in comparison to conventional lighting, where maintenance and repair costs for a lighting device are increased due to a short life of the PSU. Also, an additional spatial design is necessitated due to the presence of the PSU. To overcome these deficiencies, an alternating current (AC) driving LED is demanded to produce an LED light source without a driver, such as a conventional filament light source. Accordingly, a high driving voltage is necessary to achieve bidirectional operation and to increase power efficiency.

Since the AC driving LED basically has a high forward voltage, light is not generated and a current does not flow at a low AC portion. Optically, this is shown as repetition of ON and OFF states, that is, a flicker phenomenon. Electrically, a phase difference between a voltage and a current is caused, thereby reducing electrical quality of the LED. Related electrical characteristics include a low power factor correlation (PFC) and a high total harmonic distortion (THD). The low PFC represents an unsatisfactory power efficiency. The high THD refers to a possibility of malfunction owing to a jammer transmitted to peripheral devices.

Figure 1:
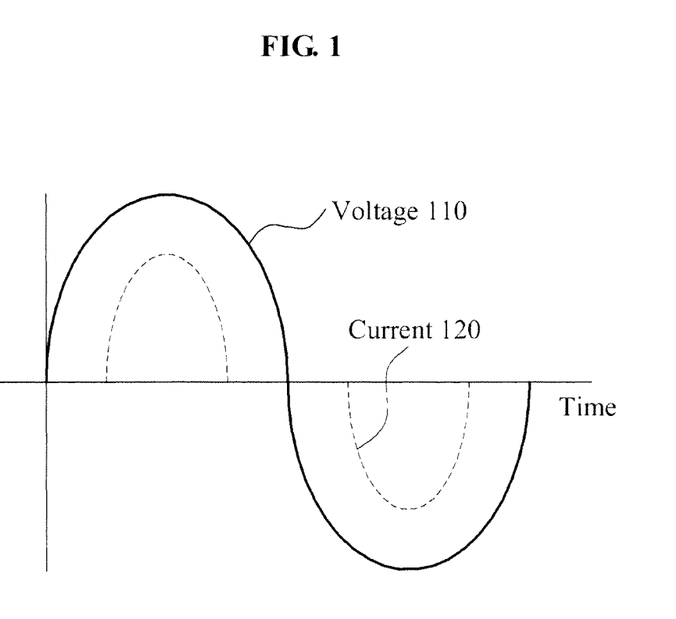
FIGS. 1 and 2 are diagrams illustrating a voltage and current waveform in a conventional light emitting circuit.

A conventional AC driving LED may have a current and voltage waveform as shown in FIG. 1. Referring to FIG. 1, when a phase difference between a current 120 and a voltage 110 is great, low PFC characteristics are undesirably obtained. As the waveform of the current 120 expands from a sine wave to a square wave, THD characteristics are increased, causing interference of electromagnetic waves. Furthermore, flicker characteristics may be reduced since the waveform of the current 120 corresponds to light emission.

Figure 2:
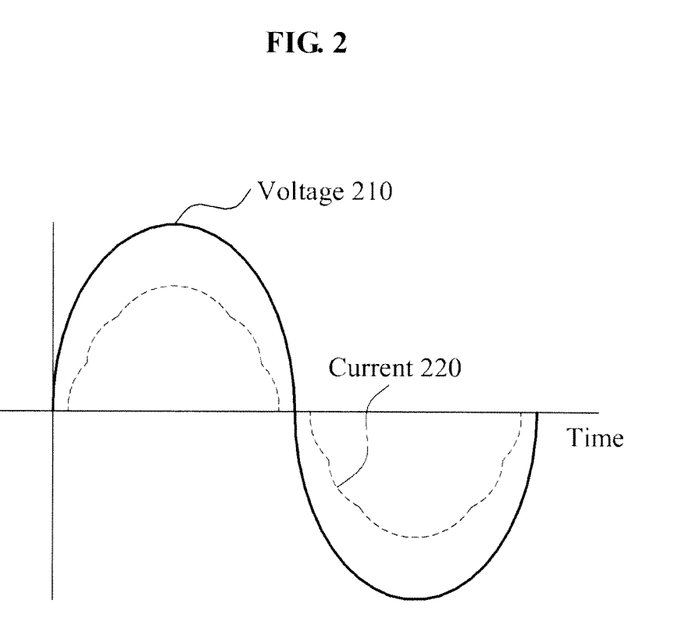

To overcome the aforementioned limits, a circuit having a current and voltage waveform as shown in FIG. 2 is necessitated because the THD characteristics and light quality are increased as a waveform of a current 220 is more similar to a waveform of a voltage 210, which is a sine wave. In addition, since the current 220 flows even at an input voltage, a phase difference between the voltage 210 and the current 220 may be reduced and, accordingly, the PFC characteristics may be increased.

A driver that uses an integrated circuit (IC) may be used to produce a circuit having the current and voltage waveform as shown in FIG. 2.

Figure 3:
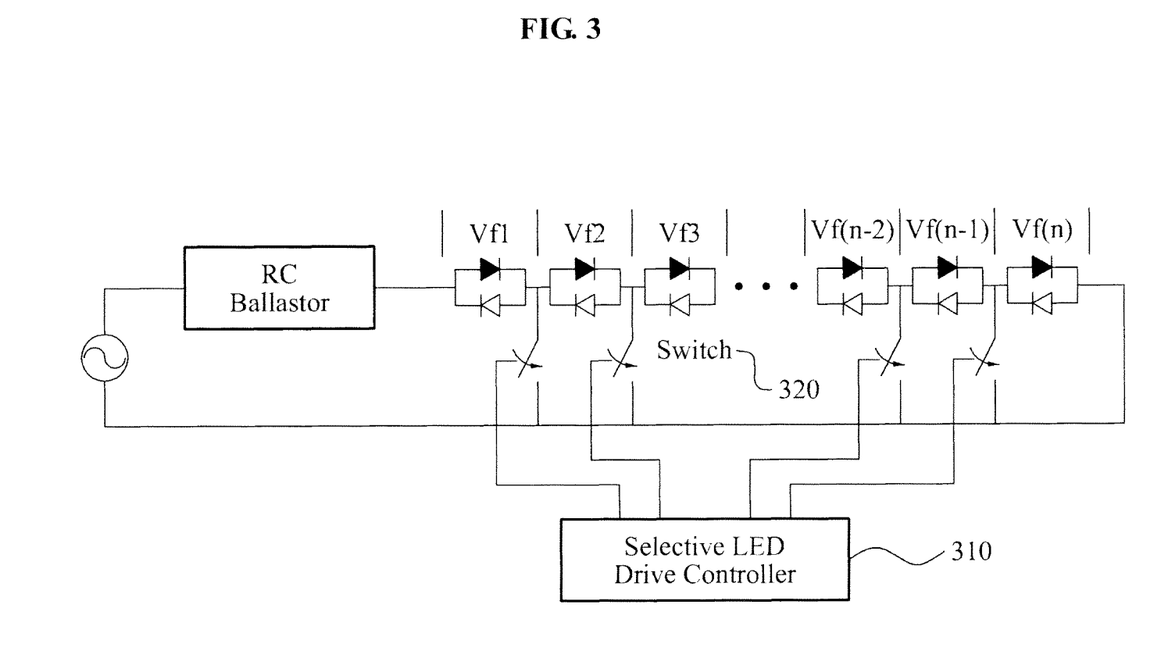
FIGS. 3 and 4 are diagrams illustrating conventional light emitting circuits applying integrated circuits (ICs)
Figure 4:
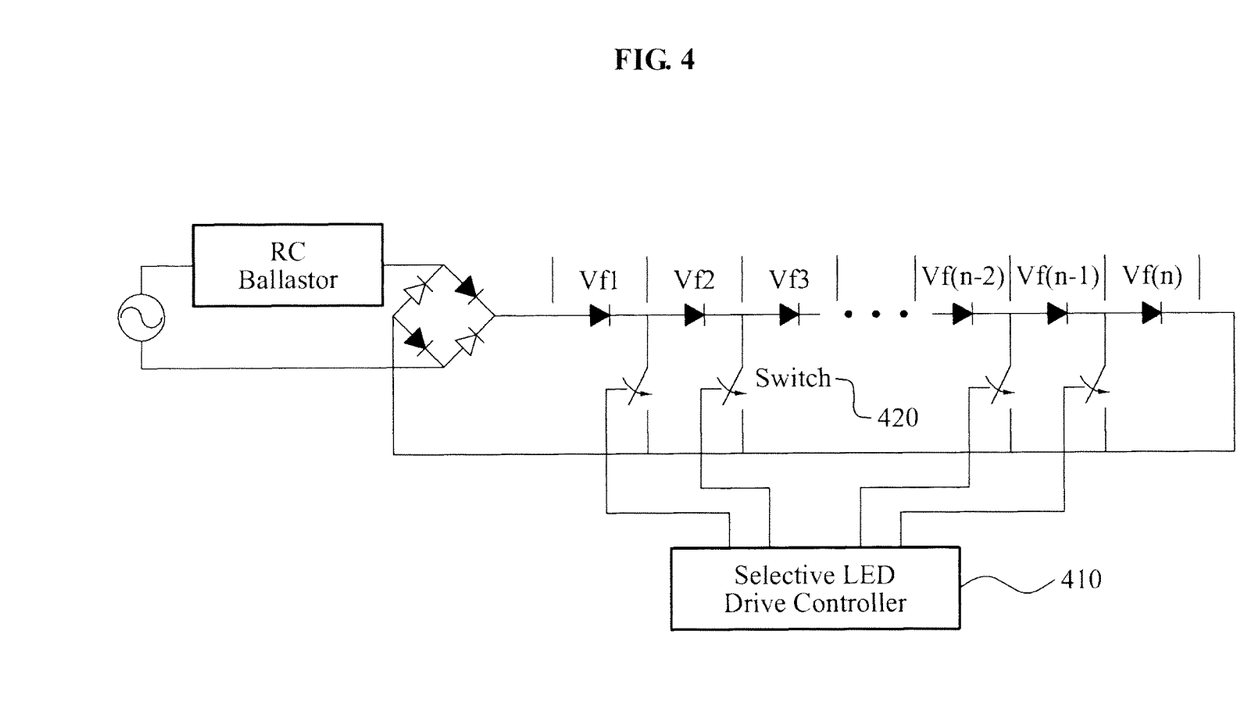

FIGS. 3 and 4 illustrate light emitting circuits applying conventional ICs. The light emitting circuits using conventional ICs 310 and 410 may selectively drive a light emitting diode (LED). Therefore, in the conventional light emitting circuits, an LED Vf1 is first turned on at a low voltage so that a current flows and, according to an increase in an input voltage, LEDs are turned on in order of Vf2 and Vf3. Thus, the current and voltage waveform as shown in FIG. 2 is achieved. However, when the ICs are used in the conventional examples of FIGS. 3 and 4, the cost is increased and the circuits become undesirably more complicated.

Thus, the need exists for further improvements in light emitting circuits without complicated designs and increased manufacturing and costs.

SUMMARY

According to an aspect of the present application, there is provided a light emitting circuit including a first light emitting diode (LED) group to which a plurality of LEDs are connected, and a second LED group to which a plurality of LEDs are connected. A resistive load is serially connected to the first LED group to control a current with respect to the first LED group. A capacitive load is serially connected to the second LED group to control a current with respect to the second LED group.

According to another aspect of the present application, there is provided a light emitting circuit including a first light emitting diode (LED) group to which a plurality of LEDs are connected, and a second LED group to which a plurality of LEDs are connected. An LED package of a four-terminal configuration is provided in which the first LED group and the second LED group are mounted in parallel connection. A resistive load is connected to any one terminal of the LED package so as to be serially connected to the first LED group. A capacitive load is connected to any one terminal of the LED package so as to be serially connected to the second LED group.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

These and/or other aspects, features, and advantages of the present application will become apparent and more readily appreciated from the following description of examples, taken in conjunction with the accompanying drawings of which.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference will now be made in detail to the examples of which are illustrated in the accompanying drawings, wherein like reference numerals refer to the like elements throughout.

Figure 5:
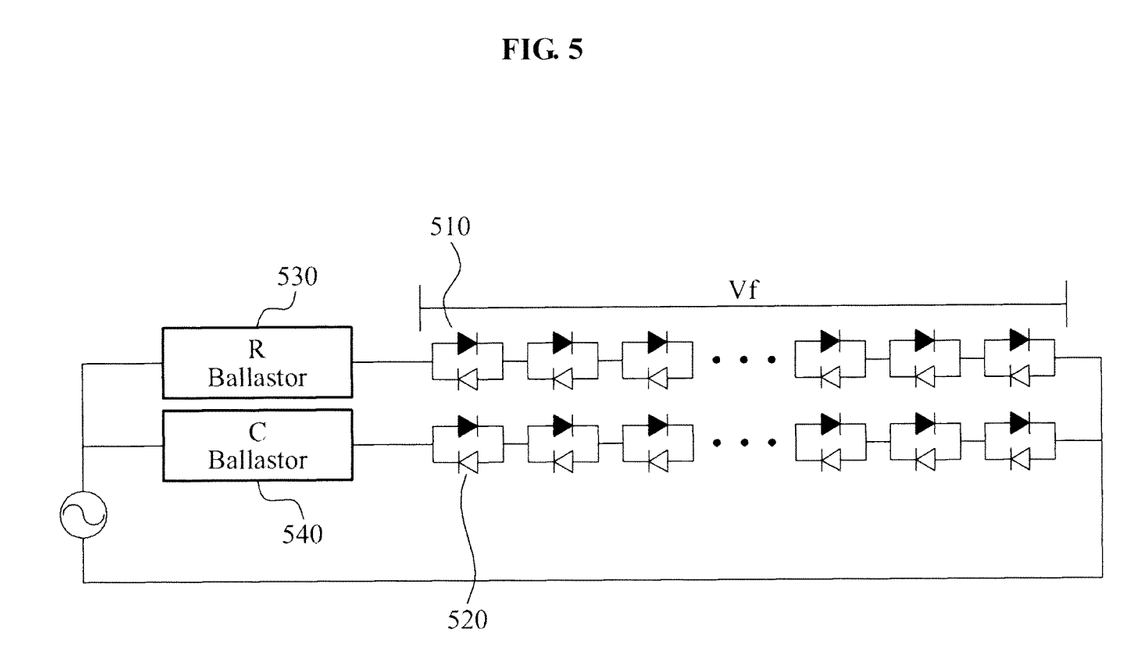
FIG. 5 is a diagram illustrating a light emitting circuit according to an example of the present application.

FIG. 5 is a diagram illustrating a light emitting circuit according to an example of the present application. The light emitting circuit may include a first light emitting diode (LED) group 510 and a second LED group 520 in which a plurality of LEDs are connected. A resistive load 530 is connected to the first LED group 510. A capacitive load 540 is connected to the second LED group 520.

According to an aspect, the first LED group 510 and the second LED group 520 may be LED groups in which a plurality of LEDs bidirectionally driven are connected. The light emitting circuit shown in FIG. 5 shows an example in which the first LED group 510 and the second LED group 520 include the plurality of LEDs which are bidirectionally driven.

The capacitive load 540 may be serially connected to the second LED group 520 so as to control a current with respect to the second LED group 520. The resistive load 530 may be serially connected to the first LED group 510 so as to control a current with respect to the first LED group 510.

Figure 6:
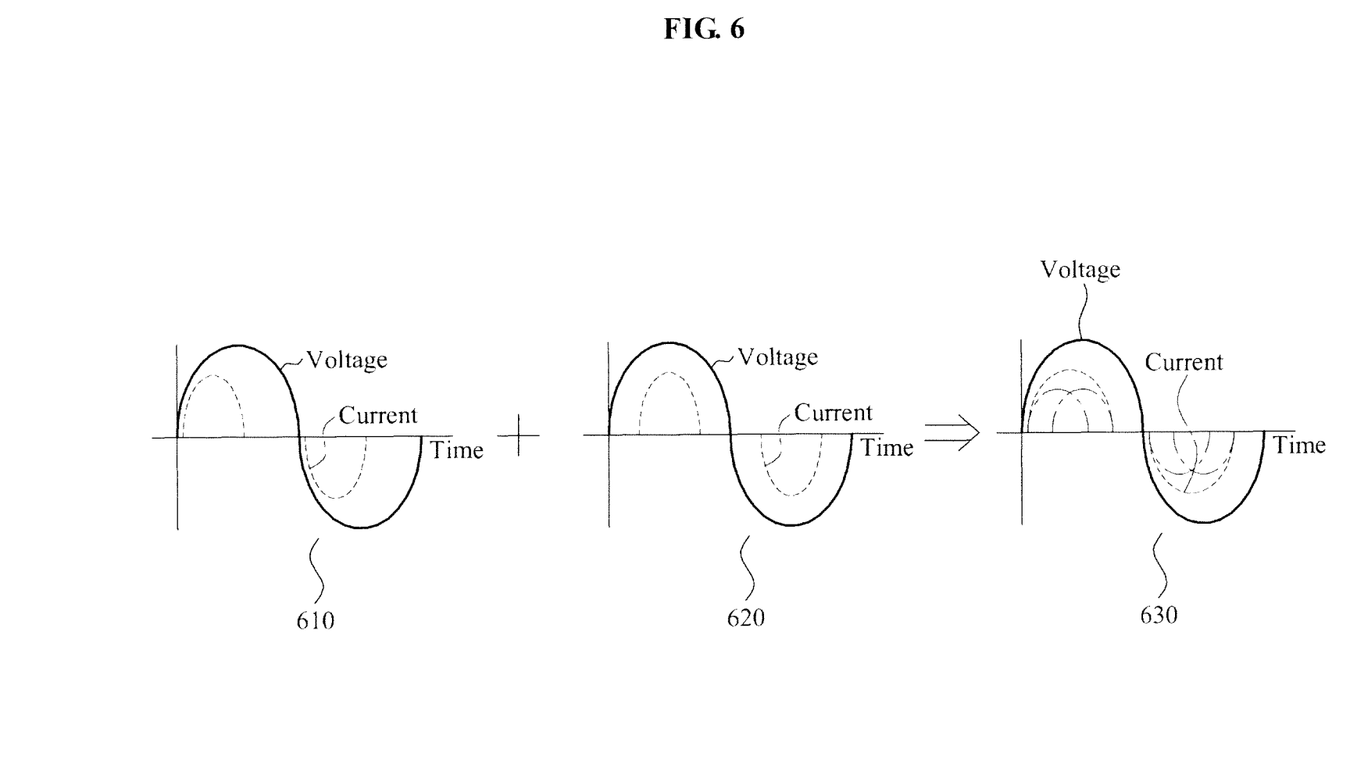
FIG. 6 is a diagram illustrating a voltage and current waveform in a light emitting circuit according to an example of the present application.

The current of the LEDs included in the second LED group 520 serially connected to the capacitive load 540 may have a first current and voltage waveform 610 of FIG. 6. That is, a current precedes a voltage. Accordingly, power factor correlation (PFC) characteristics may be low.

However, the current and voltage of the LEDs included in the first LED group 510 serially connected the resistive load 530 may have a second current and voltage waveform 620 of FIG. 6. That is, a peak phase of the current is almost equal to that of the voltage.

Therefore, overlap between the phase of the current and the phase of the voltage is generated by the capacitive load 540 and the resistive load 530. The light emitting circuit according to the present example may have characteristics such as a third current and voltage waveform 630 of FIG. 6. Thus, the light emitting circuit may achieve a current waveform similar to a sine wave. Accordingly, high total harmonic distortion (THD) characteristics may be obtained. Simultaneously, since an on duty ratio for the LEDs is increased, optically improved flicker characteristics may be obtained.

The first LED group 510 and the second LED group 520 may be implemented in different types other than the bidirectional LEDs of FIG. 5.

Figure 7:
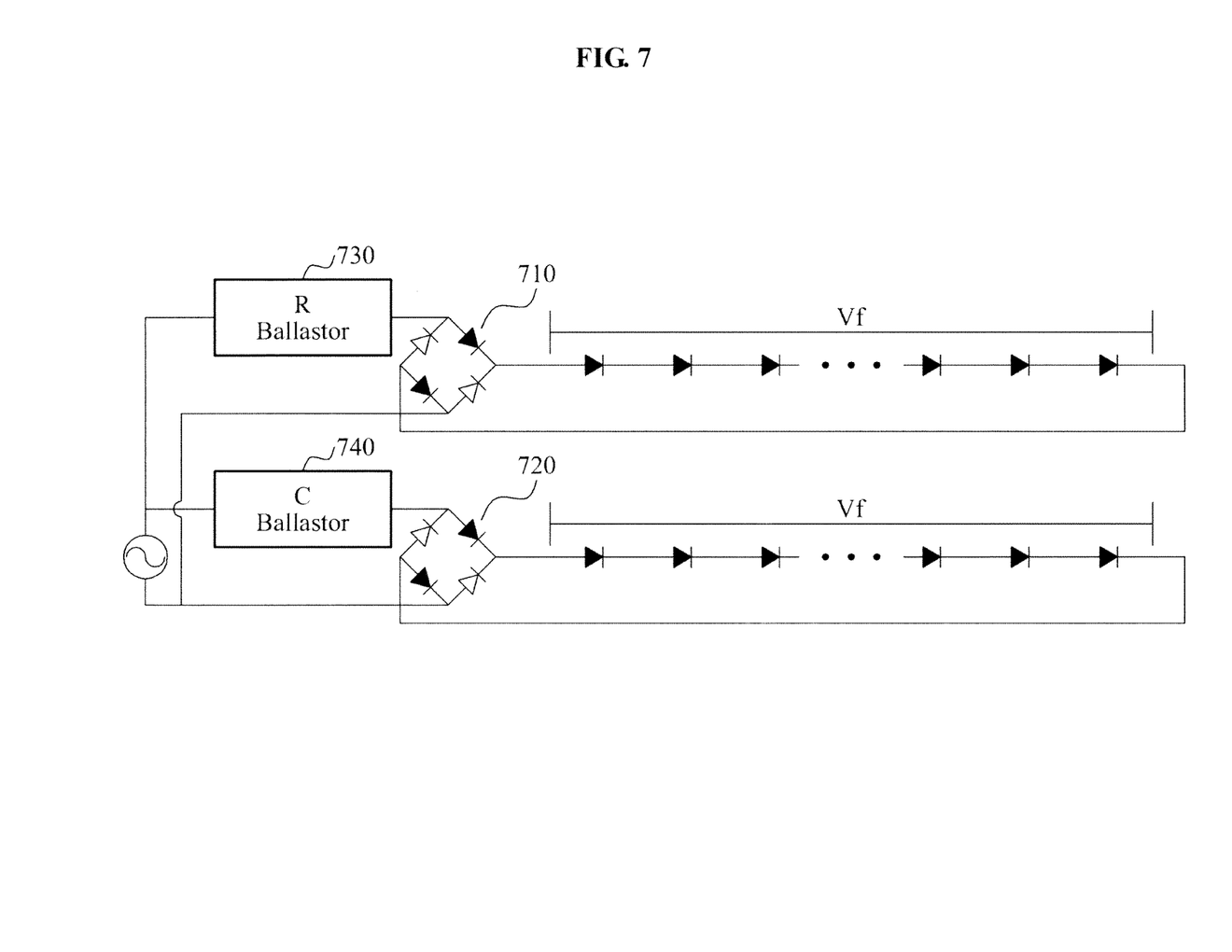
FIGS. 7 and 8 are diagrams illustrating a light emitting circuit according to another example of the present application.
Figure 8:
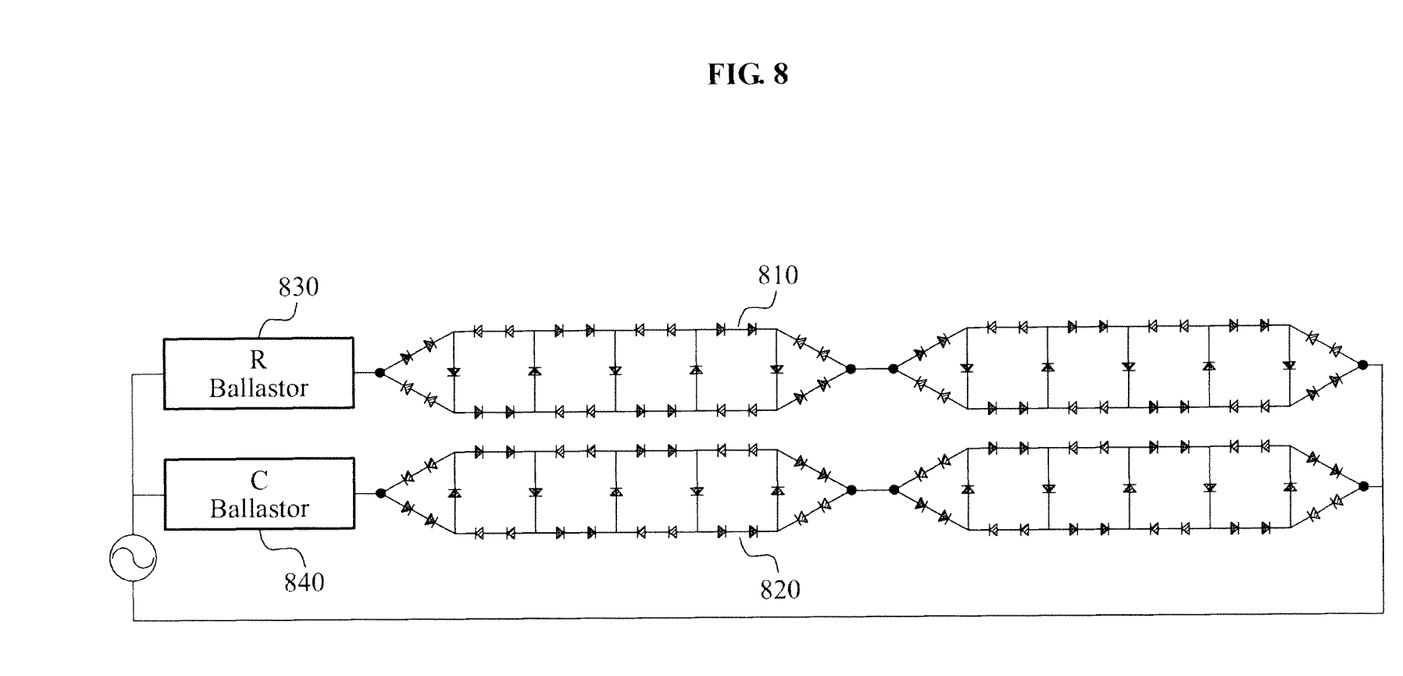

FIGS. 7 and 8 are diagrams illustrating a light emitting circuit according to another example of the present application. The first LED group and the second LED group may be LED groups in which a plurality of LEDs unidirectionally driven by a rectifier are connected.

In detail, a first LED group 710 connected with the plurality of LEDs unidirectionally driven by the rectifier may be serially connected to a resistive load 730. A second LED group 720 connected with the plurality of LEDs unidirectionally driven by the rectifier may be serially connected to a capacitive load 740. Accordingly, the light emitting circuit of FIG. 7 may have almost the same characteristics as the third current and voltage waveform 630 of FIG. 6.

According to still another examples, reference is made to FIG. 8. The first LED group 810 and the second LED group 820 may be LED groups in which a plurality of bidirectional alternating current (AC) driving LEDs are connected.

Depending on the specific examples, the first LED group and the second LED group may be LED groups including a plurality of bidirectional AC driving LEDs configured in at least one of an anti-parallel structure, a Wheatstone's bridge structure, a ladder structure, and a single string structure using a rectifier. In the example of FIG. 8, the ladder structure having a high circuit efficiency is illustrated.

In reference to FIG. 8 a first LED group 810 connected with a plurality of bidirectional AC driving LEDs may be serially connected to a resistive load 830. A second LED group 820 connected with a plurality of bidirectional AC driving LEDs may be serially connected to a capacitive load 840. Therefore, the light emitting circuit of FIG. 8 may more easily obtain an overlap effect, without using an external rectifier.

Figure 9:
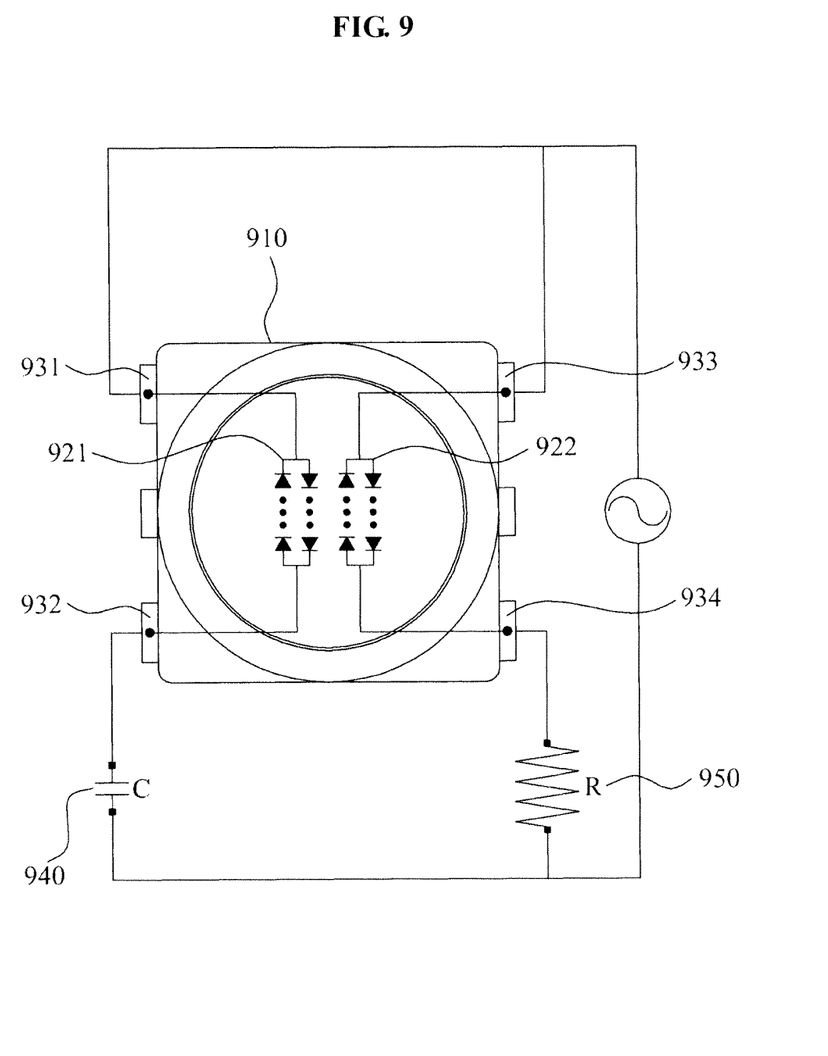
FIG. 9 is a diagram illustrating a light emitting circuit including an LED package according to an example of the present application.

FIG. 9 is a diagram illustrating a light emitting circuit including an LED package according to yet another example of the present application. The light emitting circuit may include a first LED group 922 and a second LED group 921 each of which includes a plurality of LEDs are connected. An LED package 910 having a four-terminal configuration, a resistive load 950, and a capacitive load 940 are illustrated in FIG. 9.

In the light emitting circuit, the first LED group 922 and the second LED group 921 may be connected in parallel and mounted to the LED package 910 having the four-terminal configuration. The first LED group 921 and the second LED group 922 may be any one selected from: (1) an LED group in which a plurality of bidirectional LEDs are connected, (2) an LED group in which a plurality of unidirectional LEDs are connected, and (3) an LED group in which a plurality of bidirectional AC driving LEDs are connected.

Depending on the specific examples, the first LED group 922 and the second LED group 921 may be LED groups including a plurality of bidirectional AC driving LEDs configured in at least one of an anti-parallel structure, a Wheatstone's bridge structure, a ladder structure, and a single string structure using a rectifier.

The resistive load 950 may be connected to any one terminal of the LED package 910 to be serially connected to the first LED group 922. The capacitive load 940 may be connected to any one terminal of the LED package 910 to be serially connected to the second LED group 921.

For example, in the example of FIG. 9, when the first LED group 922 is connected to a first terminal 933 and a second terminal 934 of the LED package 910 having the four-terminal configuration, the resistive load 950 may be serially connected to the first terminal 933, thereby controlling a current of the first LED group 922. When the second LED group 933 is connected to a third terminal 931 and a fourth terminal 934 of the LED package having the four-terminal configuration, the capacitive load 940 may be serially connected with the third terminal 931, thereby controlling a current of the second LED group 921. Therefore, overlap between the phase of the voltage and the phase of the current is generated by the capacitive load 940 and the resistive load 950. Accordingly, the light emitting circuit may have almost the same characteristics as the third current and voltage waveform of FIG. 6.

As described with reference to FIGS. 5, 7, 8, and 9 the light emitting circuit examples achieve desired THD characteristics and flicker improvement with a simplified passive device, without needing an additional driver such as a complicated integrated circuit (IC).

For example, with reference to an input voltage of about 120 Vac, a comparison result is shown in Table 1. In case of a resistive load, PFC characteristics are satisfactory. However, since THD characteristics are low and resistive heat loss is high, power efficiency is relatively low. Conversely, in case of a capacitive load, power efficiency is high. However, the PFC characteristics and the THD characteristics may reduced. However, when mixed driving of a resistor R and a capacitor C according to parallel connection is applied, as in the light emitting circuit according to the examples of the present application, power efficiency of about 82% and THD characteristics of about 30% or less may be obtained.

TABLE 1

| Characteristics | Resistive load | Capacitive load | Mixed driving of R and C according to parallel connection |
|---|---|---|---|
| Power efficiency | 62% | 98% | 82% |
| Power quality (PFC/THD) | 0.94/33% | 0.56/55% | 0.9/25% |

According to the examples of the present application, a light emitting circuit having desired THD characteristics and flicker improvement may be achieved without an additional driver such as a complicated IC.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A light emitting circuit comprising:
a first light emitting diode (LED) group in which a plurality of LEDs are connected;
a second LED group in which a plurality of LEDs are connected;
a resistive load serially connected to the first LED group to control a first current with respect to the first LED group; and
a capacitive load serially connected to the second LED group to control a second current with respect to the second LED group.

2. The light emitting circuit of claim 1, wherein the first LED group and the second LED group are LED groups in which a plurality of LEDs driven bidirectionally are connected.

3. The light emitting circuit of claim 1, wherein the first LED group and the second LED group are LED groups in which a plurality of LEDs driven unidirectional by a rectifier are connected.

4. The light emitting circuit of claim 1, wherein the first LED group and the second LED group are LED groups to which a plurality of bidirectional alternating current (AC) driving LEDs are connected.

5. The light emitting circuit of claim 4, wherein the first LED group and the second LED group comprise the plurality of bidirectional AC driving LEDs configured in at least one of: an anti-parallel structure, a Wheatstone's bridge structure, a ladder structure, and a single string structure using a rectifier.

6. A light emitting circuit comprising:
a first light emitting diode (LED) group in which a plurality of LEDs are connected;
a second LED group in which a plurality of LEDs are connected;
an LED package of a four-terminal configuration in which the first LED group and the second LED group are mounted in parallel connection;
a resistive load connected to any one terminal of the LED package so as to be serially connected to the first LED group; and
a capacitive load connected to any one terminal of the LED package so as to be serially connected to the second LED group.

7. The light emitting circuit of claim 6, wherein the first LED group and the second LED group are LED groups in which a plurality of LEDs driven bidirectionally are connected.

8. The light emitting circuit of claim 6, wherein the first LED group and the second LED group are LED groups in which a plurality of LEDs driven unidirectional by a rectifier are connected.

9. The light emitting circuit of claim 6, wherein the first LED group and the second LED group are LED groups in which a plurality of bidirectional alternating current (AC) driving LEDs are connected.

10. The light emitting circuit of claim 9, wherein the first LED group and the second LED group comprise the plurality of bidirectional AC driving LEDs configured in at least one of: an anti-parallel structure, a Wheatstone's bridge structure, a ladder structure, and a single string structure using a rectifier.

11. A light emitting circuit comprising:
a first light emitting diode (LED) grouping comprising a plurality of connected LEDs;
a second LED grouping comprising a plurality of connected LEDs;
a resistive load connected to the first LED grouping to control a first current with respect to the first LED group; and
a capacitive load connected to the second LED grouping to control a second current with respect to the second LED grouping.

12. The light emitting circuit of claim 11, wherein:
the resistive load and capacitive load are serially connected to the first and second LED grouping, respectively, and
the first LED grouping and the second LED grouping are LED groups to which a plurality of LEDs driven bidirectionally are connected.

13. The light emitting circuit of claim 11, wherein the first LED grouping and the second LED grouping are LED groups to which a plurality of LEDs driven unidirectionally by a rectifier are connected.

14. The light emitting circuit of claim 11, wherein the first LED grouping and the second LED grouping are LED groups to which a plurality of bidirectional alternating current (AC) driving LEDs are connected.

15. The light emitting circuit of claim 14, wherein the first LED grouping and the second LED grouping comprise the plurality of bidirectional AC driving LEDs configured in at least one of: an anti-parallel structure, a Wheatstone's bridge structure, a ladder structure, and a single string structure using a rectifier.

16. A light emitting circuit comprising:
- a first light emitting diode (LED) grouping comprising a plurality of connected LEDs;
- a second LED grouping comprising a plurality of connected LEDs;
- an LED package including a multi-terminal configuration in which the first LED grouping and the second LED grouping are mounted in parallel connection;
- a resistive load connected to any one terminal of the LED package so as to be serially connected to the first LED grouping; and
- a capacitive load connected to any one terminal of the LED package so as to be serially connected to the second LED grouping.

17. The light emitting circuit according to claim 16, wherein the LED package includes a four-terminal configuration.

18. The light emitting circuit of claim 16, wherein the first LED grouping and the second LED grouping are LED grouping to which a plurality of LEDs driven bidirectionally are connected.

19. The light emitting circuit of claim 16, wherein the first LED grouping and the second LED grouping are LED groupings to which a plurality of LEDs driven unidirectional by a rectifier are connected.

* * * * *